United States Patent
Zavalney et al.

(10) Patent No.: US 10,078,600 B2
(45) Date of Patent: Sep. 18, 2018

(54) APPARATUS AND METHOD FOR VECTOR-BASED SIGNAL ROUTING

(71) Applicant: Silicon Laboratories Inc., Austin, TX (US)

(72) Inventors: Paul I Zavalney, Austin, TX (US); Xiaohui Wang, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 9 days.

(21) Appl. No.: 13/926,629

(22) Filed: Jun. 25, 2013

(65) Prior Publication Data
US 2014/0379945 A1   Dec. 25, 2014

(51) Int. Cl.
*G06F 13/12*   (2006.01)

(52) U.S. Cl.
CPC .................. *G06F 13/126* (2013.01)

(58) Field of Classification Search
CPC ............................ G06F 17/30324; H04B 1/38
USPC ................................................ 710/11, 38, 58
See application file for complete search history.

(56) References Cited

U.S. PATENT DOCUMENTS

| | | | |
|---|---|---|---|
| 4,462,072 A * | 7/1984 | Tague et al. | 714/48 |
| 6,185,521 B1 * | 2/2001 | Vishlitzky | 703/26 |
| 6,292,062 B1 * | 9/2001 | Bourk et al. | 331/46 |
| 6,990,063 B1 * | 1/2006 | Lenoski et al. | 370/218 |
| 2005/0003794 A1 * | 1/2005 | Liu | 455/355 |
| 2006/0239337 A1 * | 10/2006 | Green et al. | 375/219 |

* cited by examiner

*Primary Examiner* — Farley Abad
(74) *Attorney, Agent, or Firm* — Trop, Pruner & Hu, P.C.

(57) ABSTRACT

An apparatus includes a memory, and a control circuit. The memory stores a vector that identifies a signal that is to be provided by an input/output (I/O) interface to a peripheral and indicates a time value. The control circuit is adapted to process the vector and route the identified signal to the peripheral and regulate a time that the signal is routed to the peripheral based on the time value.

19 Claims, 11 Drawing Sheets

APPARATUS AND METHOD FOR
VECTOR-BASED SIGNAL ROUTING

BACKGROUND

A typical microcontroller may contain a general purpose input/output (I/O) interface for purposes of communicating with devices that are external to the microcontroller. In this regard, the I/O interface may be used for such purposes as sampling analog signals; communicating digital signals; generating waveforms; providing signals that are used in connection with bidirectional communication lines (a bidirectional communication line of a serial bus, for example); and providing signals that are used for a control application.

As more specific examples, the I/O interface may generate and receive signals for purposes of communicating over a serial peripheral interface (SPI) bus, communicating over a system management bus (SMB) or providing a universal asynchronous receiver/transmitter (UART) interface. As another example, the microcontroller may generate pulse width modulation (PWM) signals that may be used for motor control or switching regulator control applications.

SUMMARY

In an example embodiment, an apparatus includes a memory, and a control circuit. The memory stores a vector that identifies a signal that is to be provided by an input/output (I/O) interface to a peripheral and indicates a time value. The control circuit is adapted to process the vector and route the identified signal to the peripheral and regulate a time that the signal is routed to the peripheral based on the time value.

In another example embodiment, a method includes storing vectors, where each vector identifies at least one signal to be provided by an input/output (I/O) interface to at least one peripheral and indicates a time value. The method includes processing the vectors to, for each vector, route the at least one identified signal to the at least one peripheral and regulate a time that the routing occurs based at least in part on the time value.

In yet another example embodiment, an apparatus includes an integrated circuit that includes an (I/O) interface, a memory that stores a plurality of vectors, a controller, peripherals and a processor core. The controller is adapted to, for each vector of the plurality of vectors, retrieve the vector from the memory without intervention from the processor core, where the vector identifies a plurality of signals provided by the I/O interface; process the vector; and in response to processing the vector, route the identified signals to the peripherals.

Advantages and other desired features will become apparent from the following drawings, description and claims.

DETAILED DESCRIPTION

Systems and techniques are disclosed herein for purposes of using a vector-based approach for scheduling peripheral components to start processing and/or transferring data. Moreover, in accordance with example embodiments, the scheduling may involve relatively minimal processor overhead.

Peripheral components of a computer system may perform certain events pursuant to a schedule that may not be periodic, or cyclic, in nature. For example, an analog-to-digital converter (ADC) may convert an analog signal into a digital signal, and this conversion may occur pursuant to a schedule that is non-periodic in nature, such as, for example, when a packet radio MCU "wakes up" to process incoming data. As such, a non-periodic triggering signal may be used to initiate the analog-to-digital conversion by the ADC. As another example, a universal asynchronous receiver/transmitter (UART) may, for example, non-periodically receive data and/or non-periodically transfer the data to a memory of a computer system.

The vector-based techniques and systems that are disclosed herein may be used to regulate a time coherency of a computer system by allowing a signal, such as a trigger signal, to be routed to a given peripheral component of a computer system at irregular times, or times that may not be scheduled using a periodic signal (a clock signal, for example).

Figure 1:
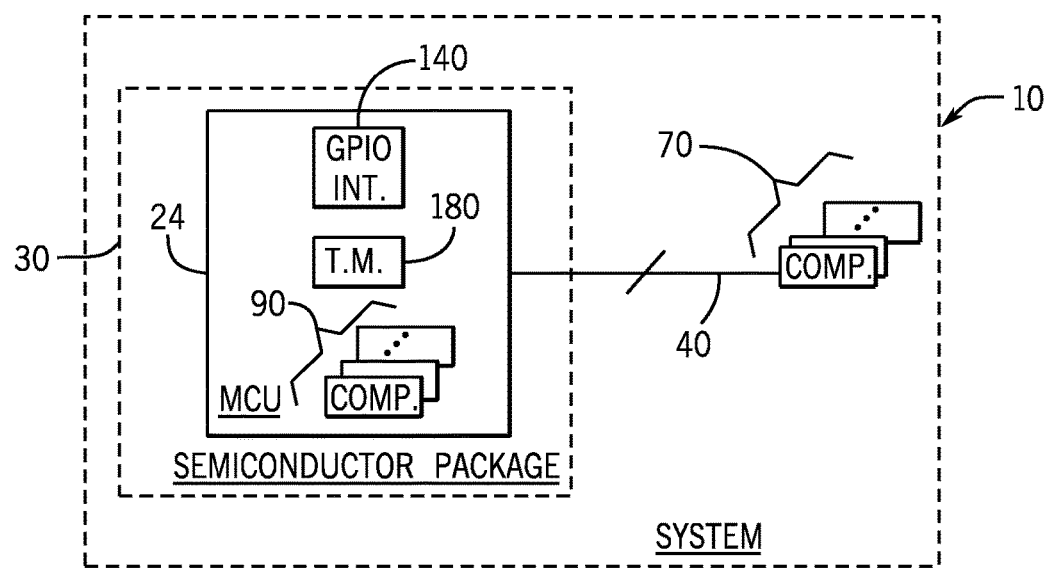
FIG. 1 is a schematic diagram of a system according to an example embodiment.

As a more specific example, FIG. 1 depicts a microcontroller unit (MCU) 24 in an example system 10. For this example, the MCU 24 controls various aspects of one or multiple components 70. As examples, the components 70 may include one of more of the following depending on the particular application: an electrical motor, a household appliance, an inventory control terminal, a computer, a tablet, a smart power meter, a wireless interface, a cellular interface, an interactive touch screen user interface and so forth. All or part of the components of the MCU 24 may be part of an integrated circuit (IC) that is contained in a semiconductor package 30. For example, all or part of the components of the MCU 24 may be fabricated on a single die or on multiple dies (a multi-chip module, for example) of the semiconductor package 30.

As depicted in FIG. 1, the MCU 24 includes a general purpose I/O (GPIO) interface 140 for purposes of generating and receiving input and output signals via inputs/outputs (I/O) 40 to communicate with the components 70. The MCU 24 further includes peripheral components 90, which performs various functions for the MCU 24. For example, these components 90 may include a Universal Asynchronous Receiver/Transmitter (UART) interface, a Universal Serial Bus (USB) interface, a system management bus interface (SMB), a serial peripheral interface (SPI), an analog-to-digital converter (ADC), and so forth. One or more of the peripheral components 90 may initiate an action in response to a triggering signal (a non-periodic signal, as an example), which is generated by the GPIO interface 140. For purposes of controlling the routing of such triggering signals, when the routing occurs and the duration relating to how long a particular signal is provided to a given peripheral component 90, the MCU 24 includes a triggering multiplexer 180 that is coupled to the I/Os of the GPIO interface 140. As disclosed herein, the triggering multiplexer 180 selectively routes triggering signals to the components 90 based on vectors. The vectors are executed in a sequence that controls when the GPIO signals that are identified by the vectors are routed to associated peripherals 90.

Figure 2:
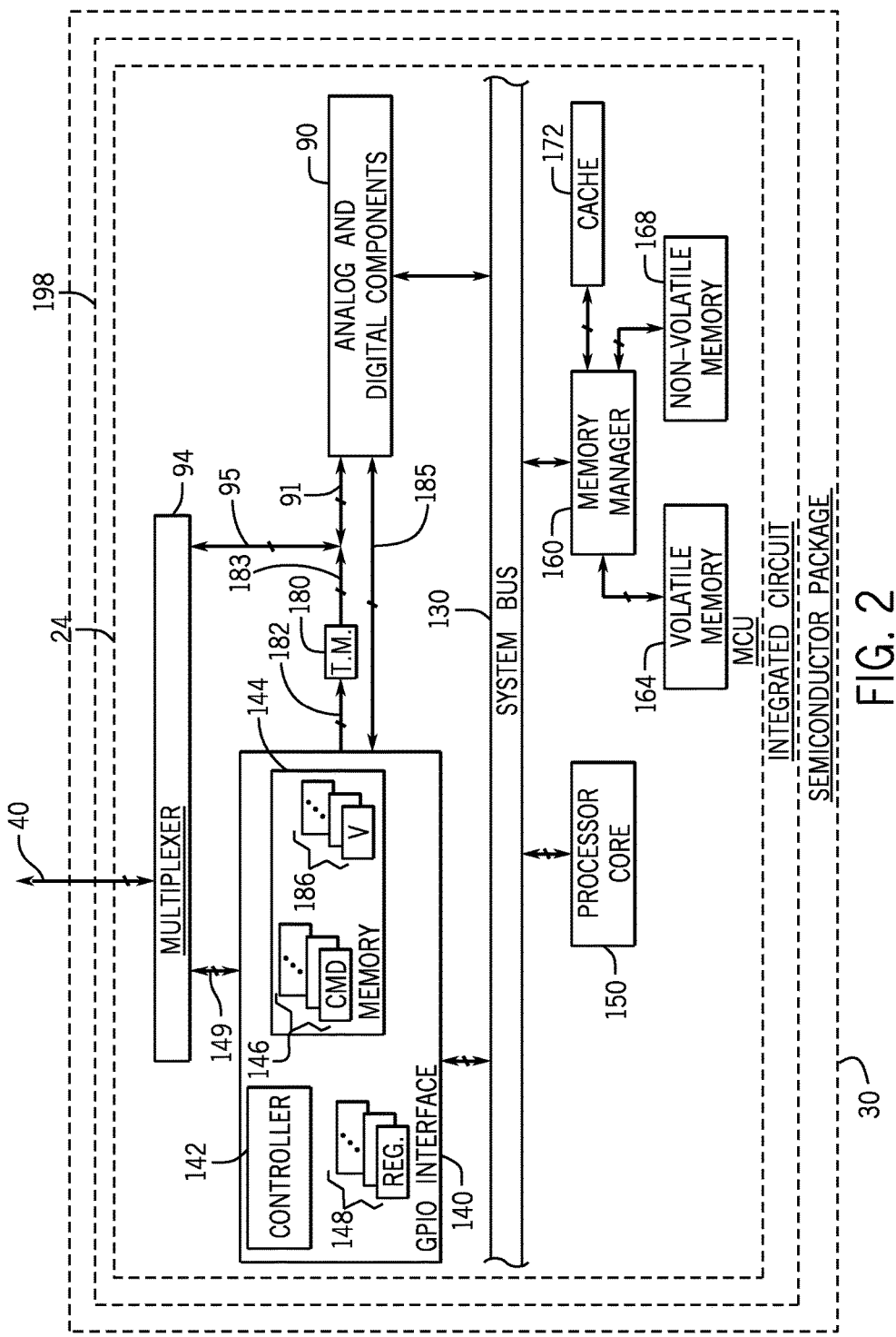
FIG. 2 is a schematic diagram of a microcontroller unit (MCU) according to an example embodiment.

Referring to FIG. 2, among its other components, the MCU 24 includes a processor core 150. Depending on the particular embodiment, the MCU 24 may not include any of the components depicted in FIG. 2 other than the processor core 150, the GPIO interface 140, a peripheral component 90 and the triggering multiplexer 180; may contain one or more of the components that are depicted in FIG. 2 in addition to these components; may contain other and/or additional components than the components that are depicted in FIG. 2; and so forth. Thus, many embodiments are contemplated, which are within the scope of the appended claims. As depicted in FIG. 2, the components of the MCU 24 may be part of an IC 198 that is contained in a semiconductor package 30, in accordance with an example embodiment.

As an example, the processor core 150 may be a 32-bit core, such as the Advanced RISC Machine (ARM) processor core, which executes a Reduced Instruction Set Computer (RISC) instruction set. In general, the processor core 150 communicates with various other system components of the MCU 24, such as a memory controller, or memory manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

It is noted that FIG. 2 depicts an exemplary representation of the MCU architecture, as the MCU 24 may have a variety of other components, bridges, buses, and so forth, in accordance with other embodiments, which are not depicted in FIG. 2. For example, in accordance with some embodiments, the MCU 24 may have a bus matrix module that implements slave side arbitration and is used to regulate access to the memory devices of the MCU 24.

In accordance with some embodiments, the MCU 24 includes the peripheral components 90, which may be, as depicted in FIG. 2, analog and digital components, in accordance with example embodiments. In general, the peripheral components 90 communicate with the I/Os of the GPIO interface 140 using communication lines 91 and 185. As further disclosed herein, at least some of the communication lines 91 and 185 may communicate triggering signals from the GPIO interface 140. In this manner, some of the communication lines 91 may be coupled to outputs 183 of the triggering multiplexer 180; and other communication lines 185 may be communicated directly to I/Os of the GPIO interface 140. As depicted in FIG. 2, the triggering multiplexer 180 is coupled to I/Os of the GPIO interface 140 via associated communication lines 182.

The peripheral components 90 may communicate data with the processor core 150 using the system bus 130. In accordance with an example embodiment, the MCU unit 24 includes a multiplexer 94, which permits the programmable assignment of selected I/Os of the GPIO interface 140 to external I/Os 40 (see also FIG. 1). The MCU 24 may contain one or more registers to, among other functions, permit the selective assignment of the I/Os 40 to the I/Os 149 and the configuration of the I/Os 149 as being either dedicated inputs or outputs via associated bits of the register(s).

More specifically, in accordance with example embodiments, the GPIO interface 140 includes one or more registers 148, which may be programmed for purposes of defining the I/O communication flow directions; configuring various aspects of the signal generation by the GPIO interface 140 (as further disclosed below); and controlling the vector-based signal routing (as further disclosed below). In general, the GPIO interface 140 maps a given I/O of the GPIO interface 140 to a given I/O 149, 182 or 185 and regulates the state of the I/O, as disclosed herein. For the exemplary embodiments disclosed herein, it is assumed that at least some I/Os of the GPIO interface are configured by the register(s) 148 to be routed to the communication lines 182, and the downstream routing of the signals associated with these I/Os is controlled by vectors 186 that are processed by the GPIO's controller 142.

In accordance with an example embodiment, the GPIO interface 140 includes a memory 144 (a first in first out (FIFO)-based memory, for example), which stores I/O interface commands 146 to control the I/O states of the I/Os 149, 182 and 185; and the vectors 186 that control the routing of the signals associated with the communication lines 182 to the peripheral components 90. In this regard, in accordance with an example embodiment, the memory 144 stores the I/O interface commands 146 and the vectors 186 so that the commands 146 are retrieved and processed by the controller 142 of the GPIO interface 140 in a predefined order, or sequence; and the vectors 186 may also retrieved and processed by the controller 142 in a predetermined order, or sequence. In further embodiments, separate controllers may process the I/O commands 146 and vectors 186.

Figure 3:
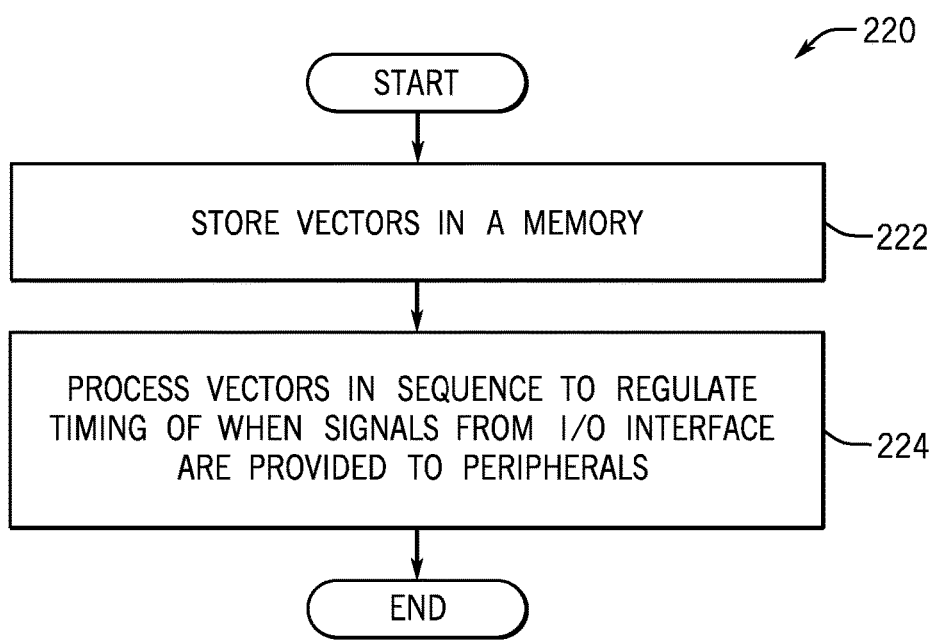
FIG. 3 is a flow diagram depicting a vector-based signal routing technique according to an example embodiment.

Referring to FIG. 3 in conjunction with FIG. 2, in accordance with an example embodiment, the controller 142 performs a technique 220 for purposes of routing triggering signals to the peripheral components 90. Pursuant to the technique 220, the controller 142 stores (block 222) vectors in a memory and processes (block 224) the vectors in a sequence to regulate a timing of when signals that are provided by the I/O interface are provided to the peripheral components 90.

Figure 4:
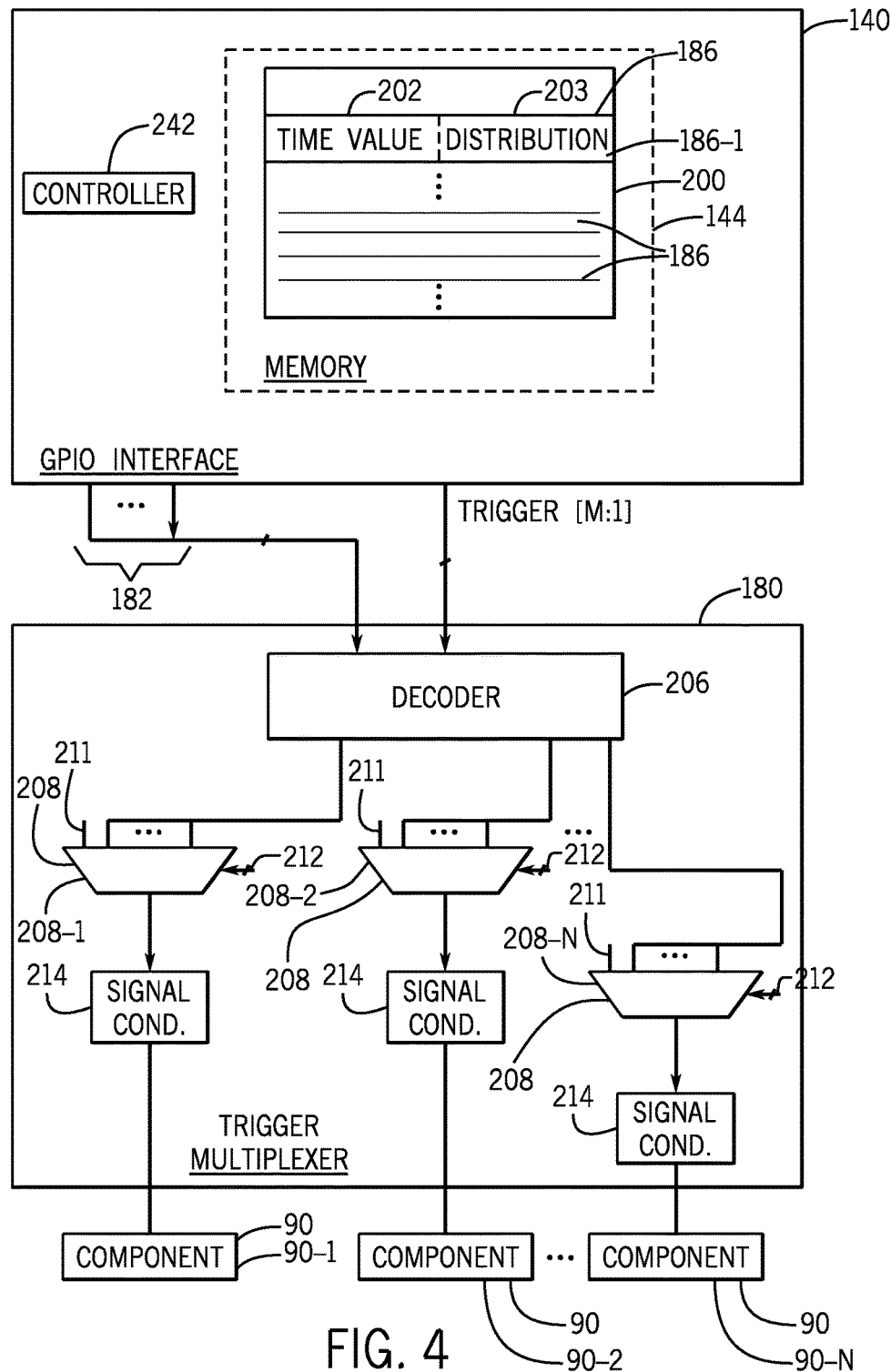
FIG. 4 is a schematic diagram of the I/O interface and trigger multiplexer of the MCU according to an example embodiment.

FIG. 4 generally depicts a control circuit to process the vectors 186 and provide the I/Os of the GPIO interface 140 to the peripheral components 90 due to this processing, in accordance with an example embodiment. Referring to FIG. 4, in accordance with an example embodiment, the vectors 186 are stored in a vector first in first out (FIFO) buffer 200 of the memory 144. In general, as illustrated by vector 186-1, the vector 186 may include a time value field 202 and a distribution field 203. The distribution field 203 contains data that identifies the signals or I/Os 182 of the GPIO interface; and the time value field 202 contains data that identifies a time value identifying a duration in which the identified signals are provided to the components 90. In an example embodiment, the time value field 202 may be a 14 bit field; and the field 203 may be a 16 bit field, although other configurations and numbers of bits may be used in other embodiments. Thus, when the controller 142 processes a given vector 186, the time value field 202 contains data that identifies the time duration until the next vector 186 is processed.

In accordance with an example embodiment, the controller 142 furnishes a M bit multiple signal (called "TRIGGER [M:1]" herein), which indicates the routing of the GPIO interface's I/Os to the peripheral components 90 (N peripheral components 90-1, 90-2 ... 90-N, being depicted in FIG. 4 as examples). The TRIGGER[M:1] signal identifies, or indicates, $(M+1)^N$ combinations between the I/Os of the GPIO interface 140 and the peripheral components 90, in accordance with example embodiments.

In accordance with an example embodiment, the trigger multiplexer 180 includes a decoder 206, which receives the TRIGGER[M:1] signal and the I/Os 182. The decoder 206 generates decoded signals on control signal inputs for N multiplexers 208 (multiplexers 208-1, 208-2 and 208-N, being depicted in FIG. 4 as examples), which are individually associated with the peripheral components 90, in accordance with example embodiments. In general, in accordance with example embodiments, the association of the GPIOs to the peripheral components 90 may be statically programmed; and the timing of when the associated signals are provided by the peripheral components 90 is dynamically controlled by the processing of the vectors. For example, the multiplexer 208-1 receives its inputs from the decoder 206, and the multiplexer 208-1 routes one of its input signals to its output (as configured by control inputs 212). In this manner, in accordance with an example embodiment, based on the control signals, the multiplexer 208-1 may couple either one of the signals on the I/Os 182 (after being routed by the decoder 206) to its output or a default signal 211 (a tri-state or state having a predefined logic level, for example) to the output, depending on whether the associated vector 186 identifies an I/O signal that is associated with the multiplexer 208-1. If the associated vector 186 identifies an I/O signal that is associated with the multiplexer 208-1, then the multiplexer 208-1 routes the I/O signal to the associated component 90-1 until the controller 142 changes the TRIGGER[M:1] signal by processing another vector 186.

As depicted in FIG. 4, the trigger multiplexer 180 may include a signal conditioning circuit 214 for each of the components 90. In this regard, the signal conditioning circuit 214 conditions the signal provided by an associated multiplexer 208 for the requirements of an associated component 90. For example, the signal conditioning circuit 214 may stretch pulses generated by the GPIO interface 140 in time for purposes of meeting timing specifications of the associated component 90. As another example, the signal conditioning circuit 214 may generate a signaling protocol for communication with the associated peripheral component 90. For example, in accordance with example embodiments, a signal conditioning circuit 214 may route the signal provided by the multiplexer 208 to the peripheral component 90 using an asynchronous signaling protocol. In accordance with an example embodiment, the signal conditioning circuit 214 is programmable with the signal conditioning (communication protocol, pulse padding, and so forth).

Figure 5:
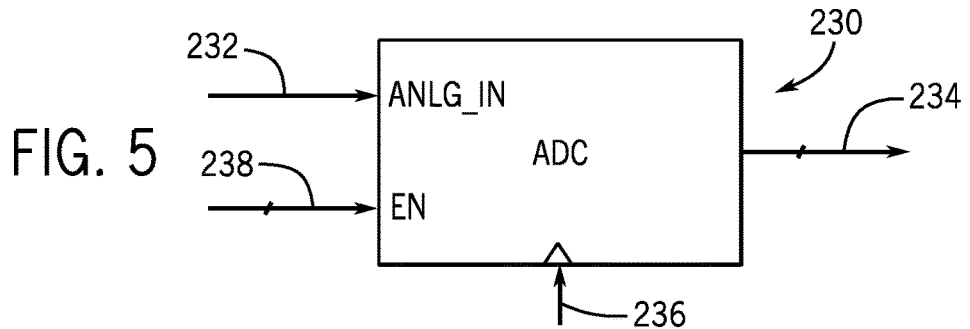
FIG. 5 is a schematic diagram of an analog-to-digital converter (ADC) according to an example embodiment.

Referring to FIG. 5, as an example, the peripheral component 90 may be an analog-to-digital converter (ADC) 230, which receives a trigger signal at an enable input 238. In this regard, the ADC 230 may clock its digital output signal (provided at outputs 234) in response to clock edges on a clock input 236. In general, the ADC 230 converts an analog signal that is received at its input terminal 232.

Figure 6:
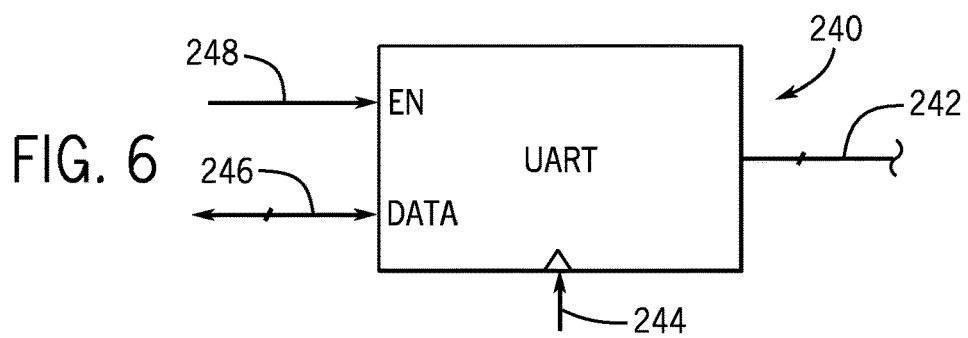
FIG. 6 is a schematic diagram of a universal asynchronous receiver/transmitter (UART) interface according to an example embodiment.

As another example, referring to FIG. 6, the peripheral component may be a UART interface 240, which communicates with a UART link 242 in synchronization with a clock signal received at a clock input 244. The UART interface 240 communicates data (via data lines 246) with the system bus 30 (see FIG. 2) and receives a trigger signal at its enable input 248 for purposes of triggering the UART interface 240 to communicate data.

Figure 7:
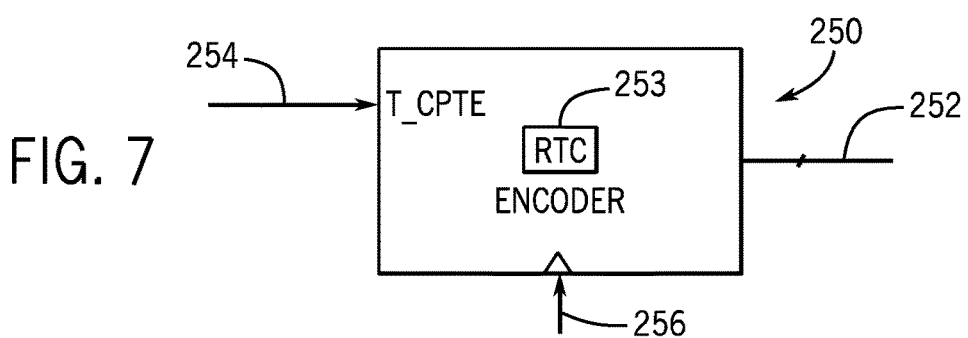
FIG. 7 is a schematic diagram of an encoder according to an example embodiment.

Referring to FIG. 7, another example, one of the peripheral components 90 may be an encoder 250, which provides encoded data (at its outputs 252) in synchronization with a clock signal (received at its clock input 257. The encoder 252 may timestamp the data (using a real time clock (RTC) 253, for example) when a triggering signal is received at its time capture input 254.

Figure 8:
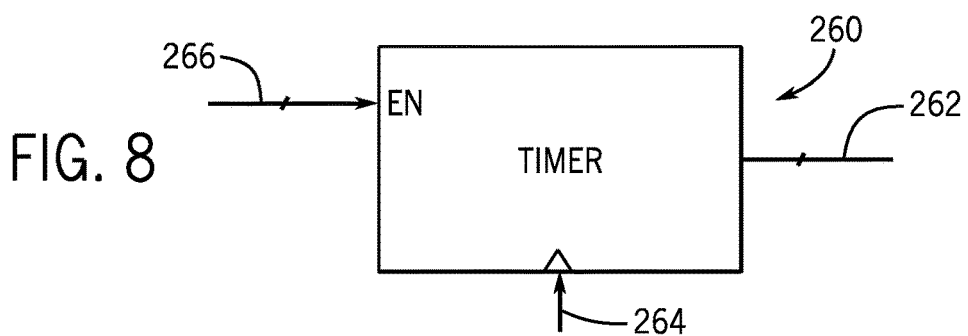
FIG. 8 is a schematic diagram of a timer according to an example embodiment.

Referring to FIG. 8, as yet another example, one of the peripherals 90 may be a timer 260, which furnishes a signal 262 indicating a particular duration of time, as measured in clock cycles received at a clock input 264. The timer 260 may be initiated, or started, using a trigger signal that is received at a corresponding input 266 of the timer 260.

Referring back to FIG. 2, in accordance with example embodiments, the GPIO interface 140 generates its signals by executing the I/O interface commands 146. As further disclosed herein, each I/O interface command 146, when executed by the controller 142, controls the I/O state(s) of the I/Os that are designated to be controlled (by the corresponding configuration register bits) by the GPIO interface 140. For each I/O to be controlled, each I/O interface command 146 contains data that represents, or indicates, an associated I/O state for the I/O and data that represents, or indicates, a time duration for that I/O state. As further disclosed herein, the I/O state may be a state in which the I/O is driven to a particular logic value; a sampling state in which the I/O samples an external signal after a predefined duration of time; a state defining a sampling protocol; a state defining a bidirectional communication protocol; and so forth.

The time-successive processing of the I/O interface commands 146 and/or the vectors 186 by the controller 142, in accordance with example embodiments, occurs without intervention by the processor core 150. In this regard, in accordance with example embodiments, the controller 142 retrieves the I/O interface commands 146 and/or vectors 186 from the memory 144 and executes the I/O interface commands 146 in a predefined execution order so that corresponding I/O states appear in a predefined sequence and are routed to the appropriate peripherals 90 at the appropriate times. An advantage of this arrangement is that the controller 142 may not use a bus having an unpredictable latency, such as the system bus 130, for example; and as such, the I/O states of the I/Os as well as the routing of the I/Os may be regulated in a deterministic manner.

In accordance with example embodiments, as further disclosed herein, the GPIO interface 140 is constructed to perform direct memory access (DMA) to the volatile memory 164 for purposes of retrieving the commands 146 and the vectors 186 and storing the commands 146/vectors 186 and the vectors 186 in the memory 144. In this manner, in accordance with an example embodiment, the GPIO interface 140 may perform such a DMA access to replenish the commands 146 and vectors 186, when the number of queued I/O interface commands 146 and/or vectors 186 in the memory 144 decreases below predefined threshold(s).

As an example, the processor core 150 may queue the commands 146 and/or vectors 182 in the non-volatile memory 164. In a further embodiment, the processor core 150 may periodically, or upon receiving an interrupt (as an example) from the GPIO interface controller 140 indicating replenishment of the commands 146 is requested, retrieve more I/O interface commands 146 and/or vectors 186 (if available) from the volatile memory 164 and store the commands 146 and/or vectors 186 in the memory 144 via write operations over the system bus 130. Thus, many variations are contemplated, which are within the scope of the appended claims.

Figure 9:
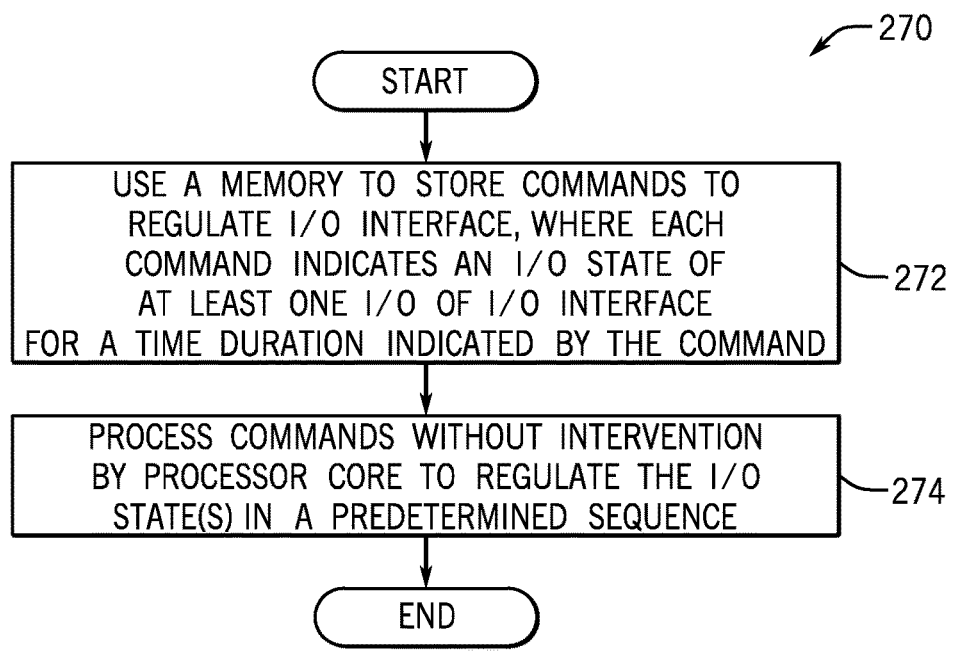
FIG. 9 is a flow diagram depicting a technique to regulate an I/O interface of the MCU of FIG. 2 according to an example embodiment.

Thus, referring to FIG. 9, in accordance with example embodiments, a technique 270 includes using (block 272) a memory to store commands to regulate an I/O interface, where each command indicates at least one I/O state of at least one I/O of the I/O interface for a time duration that is also indicated by the command. Pursuant to the technique 270, the commands are executed (block 274) without intervention by the processor core 150 to regulate the I/O state(s) in a predetermined sequence.

Figure 10:
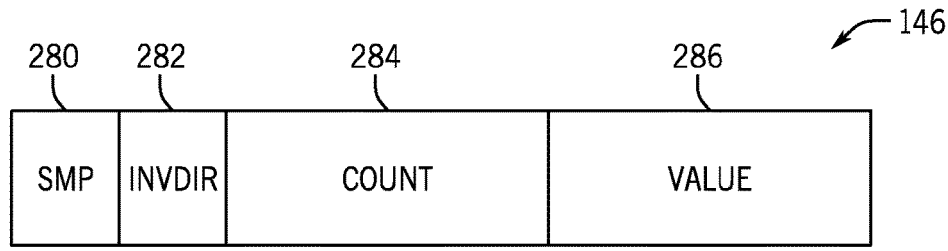
FIG. 10 is an illustration of a structure of an I/O interface command according to an example embodiment.

FIG. 10 depicts an example structure for the I/O interface command 146, in accordance with some embodiments. As an example, the command 146 may be a word, or 32-bits, although the command 146 may contain fewer or more than 32 bits, in accordance with other embodiments. For the example of FIG. 10, the command 146 includes a count field 284, which contains data indicating the duration of an associated I/O state. In some embodiments, the count field 284 contains data indicating the number of cycles of a given clock. The I/O interface command 146 further includes a value field 286, which contains data that represents, or indicates, the values to be driven to the I/Os 149 (see FIG. 2).

For example, in accordance with some embodiments, if the GPIO interface 140 includes sixteen I/Os whose states are to be represented by the processing of the commands 146, the value field 286 is a sixteen bit data field containing, where each bit is either a "1" (i.e., a logic one) or a "0" (i.e., a logic zero). These logic states, in turn, control the I/O states of associated I/Os. For example, if the value field 286 contains a "1" bit, when a corresponding I/O of the GPIO interface 140 is to be driven during the associated duration specified by the count field 284 to a logic one.

In addition to the I/O state and duration indicated by the value 286 and count 284 fields, the I/O interface command 146 may further contain one or multiple control bits, to further specify the I/O states. For example, in accordance with example embodiments, the command 146 may contain a field 282 (a one bit field, for example), which indicates or represents whether the communication flow directions of certain I/Os are to be reversed, or inverted, during the associated duration specified by the count field 284.

More specifically, in accordance with example embodiments, invert field 282 is used in combination with one or multiple other "static" registers 148 (see FIG. 2) of the GPIO interface 140, such as a register 148 that indicates, on a bitwise level, whether corresponding I/Os 149 are subject to the inversion indicated by the field 282; and a communication flow direction register 148, which in general, statically indicates the communication flow direction, on a bitwise basis, for the corresponding I/Os.

In accordance with example embodiments, the following truth table describes the command syntax used in connection with the I/O interface command 146 and above-described registers:

TABLE 1

| invdiren | invdir | dir | Value | gpio | gpio_out | gpio_oe |
|---|---|---|---|---|---|---|
| 0 | X | 1 | 0 | Drive 0 | 0 | 1 |
| 0 | X | 1 | 1 | Drive 1 | 1 | 1 |
| 0 | X | 0 | 0 | High Z | X | 0 |
| 0 | X | 0 | 1 | High Z | X | 0 |
| 1 | 1 | 0 | 0 | Drive 0 | 0 | 1 |
| 1 | 1 | 0 | 1 | Drive 1 | 1 | 1 |
| 1 | 0 | 0 | 0 | High Z | X | 0 |
| 1 | 0 | 0 | 1 | High Z | X | 0 |
| 1 | 1 | 1 | 0 | High Z | X | 0 |
| 1 | 1 | 1 | 1 | High Z | X | 0 |
| 1 | 0 | 1 | 0 | Drive 0 | 0 | 1 |
| 1 | 0 | 1 | 1 | Drive 1 | 1 | 1 |

In Table 1, "X" represents a high impedance state, "1" represents a logic one state and "0" represents a logic zero state; "invdiren" represents a corresponding bit of the static register 149 identifying whether inversion is permitted for the corresponding I/O 149; "invdir" represents the value of the field 282 (see FIG. 10); "dir" represents the assigned static communication flow direction by the register 148; "value" represents the I/O state value of the field 286, "gpio" represents the corresponding I/O state; "gpio_out" represents the corresponding signal appearing on the I/O; and "gpio_oe" represents an output enable state of the I/O 149 (representing the output enable state of the corresponding buffer, or driver). Thus, using row four of Table 1 as an example, when the invdiren inversion enable bit is "0," the invert field 282 does not affect the I/O state. Conversely, using line ten of Table 1 as an example, when the invdiren invert enable bit is asserted, then an asserted invdir value for the field 282 causes the I/O to serve as an input, although the dir bit indicates that the I/O is an output.

The command 146 may contain various other control fields, in accordance with further embodiments. For example, in a further example embodiment, field 286 (FIG. 10) of the command 146 may be used in a wait feature. In this manner, the field 286 may serve as a value to be matched, and the controller 142 may monitor the I/Os and hold the execution of the command 146 until the match occurs. An external controller triggers the match by providing the match value (as signals) to the I/Os. The match may be configured by another static register (a wait mask register) to determine which one or many I/Os are to be monitored for the match value.

Figure 11:
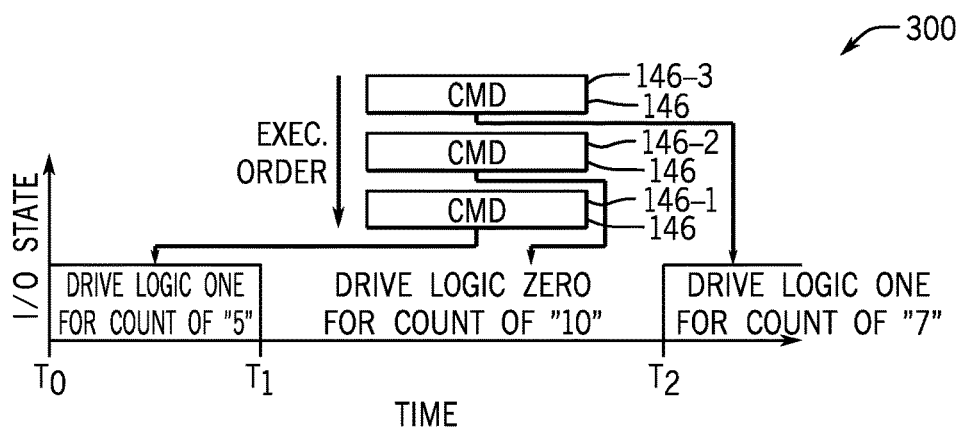
FIG. 11 is an illustration of use of the I/O interface commands to drive a signal onto an I/O of the I/O interface according to an example embodiment.

FIG. 11 depicts an illustration 300 in which example I/O interface commands 146-1, 146-2 and 146-3 are used to generate a waveform on a corresponding I/O. In this manner, as depicted in FIG. 11, the I/O interface commands 146-1, 146-2 and 146-3 are executed in a predefined execution order (as defined in the order in which the I/O interface commands 146 are stored in the memory 144, for example) such that I/O interface command 146-1 is executed first, the I/O interface command 146-2 is executed second and the I/O interface command 146-3 is executed last. At time $T_0$, the controller 142 executes the I/O interface command 146-1, which specifies that the I/O is to be driven to a logic one for a duration, or count, of "5" (five clock cycles, for example). Thus, from time $T_0$ to time $T_1$, five clock cycles elapse, and at time $T_1$, the controller 142 executes the next I/O interface command 146-2 which now controls the I/O state.

As shown, for this example, the I/O interface command 146-2 specifies that the I/O is to be driven to a logic zero value for a count of "10" (i.e., ten clock cycles), which occurs between time $T_1$ to time $T_2$. At the expiration of the ten clock cycles at time $T_2$, the controller 142 executes the I/O interface command 146-3, which specifies that the I/O is to be driven to a logic one value for a count of 7." Thus, as a non-limiting example, FIG. 11 illustrates how a particular waveform, such as a PWM waveform (as an example) may be generated on a given I/O using the I/O interface commands 146 for a dedicated output terminal.

Other I/Os of the GPIO interface 140 may be designated input terminals. In this regard, the I/O interface commands 146 may be executed to regulate a sampling interval, such that after a predefined count period, the MCU 24 samples the value present on the I/O. A given I/O may alternate between being designated as an input terminal and being designated as an output terminal, in accordance with some embodiments. In this manner, such an I/O may be used for bidirectional communication, such as a communication on a serial bus, handshaking, and so forth.

Figure 12:
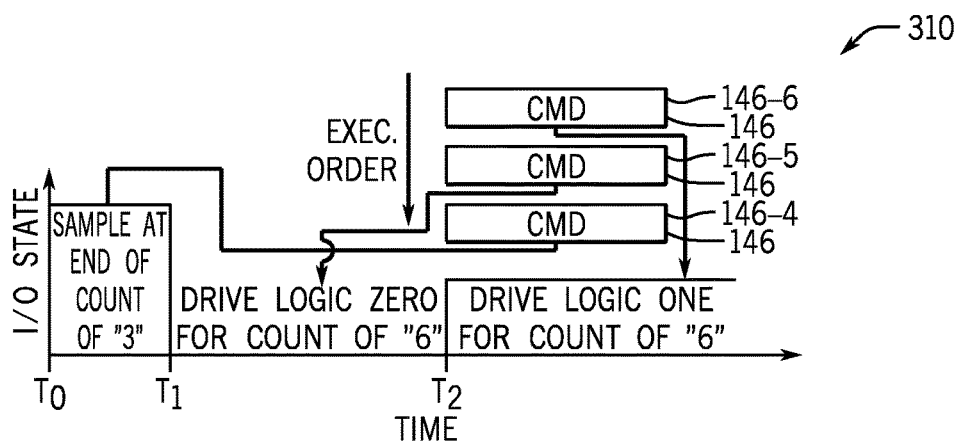
FIG. 12 is an illustration of the use of I/O interface commands to configure an I/O of the I/O interface for bidirectional communication according to an example embodiment.

FIG. 12 depicts an illustration 310 of an I/O state for an associated I/O that is used both as an input terminal and as an output terminal. For this example, the controller 142 successively executes three I/O interface commands 146 in the following order: I/O interface command 146-4; I/O interface command 146-5; and I/O interface command 146-6. The execution of the I/O interface command 146-4 establishes the I/O as an input terminal from time $T_0$ to time $T_1$, where time $T_0$ to time $T_1$ is separated by a count of "3." In this regard, depending on the particular embodiment, the execution of the I/O interface command 146-4 may invert the communication flow direction of the I/O 149 or not, depending on the statically-defined definition in the static GPIO register.

At time $T_1$, for this example, the controller 142 executes the I/O interface command 146-5, which causes the GPIO interface controller 140 to drive the I/O to a logic zero value for a count of "6," from time $T_1$ to time $T_2$. Thus, from time $T_1$ to time $T_2$, the I/O is an output terminal. This may be established by inverting the flow direction of the I/O (if statically configured as an input terminal), depending on the particular configuration. At time $T_2$, the controller 142 executes the command 146-6 which maintains the I/O as an output but changes the value driven on the terminal to be a logic one value for count of "6."

As an example, from time $T_0$ to time $T_1$, the GPIO interface controller 140 may use the I/O to sense a signal driven by another entity; and the two subsequent logic zero and logic one levels may be used to acknowledge the sensed signal. Thus, the illustration 310 may be viewed as a handshaking example, although other applications of using the same I/O as both an input terminal and as an output terminal may be employed, in accordance with further embodiments.

Figure 13:
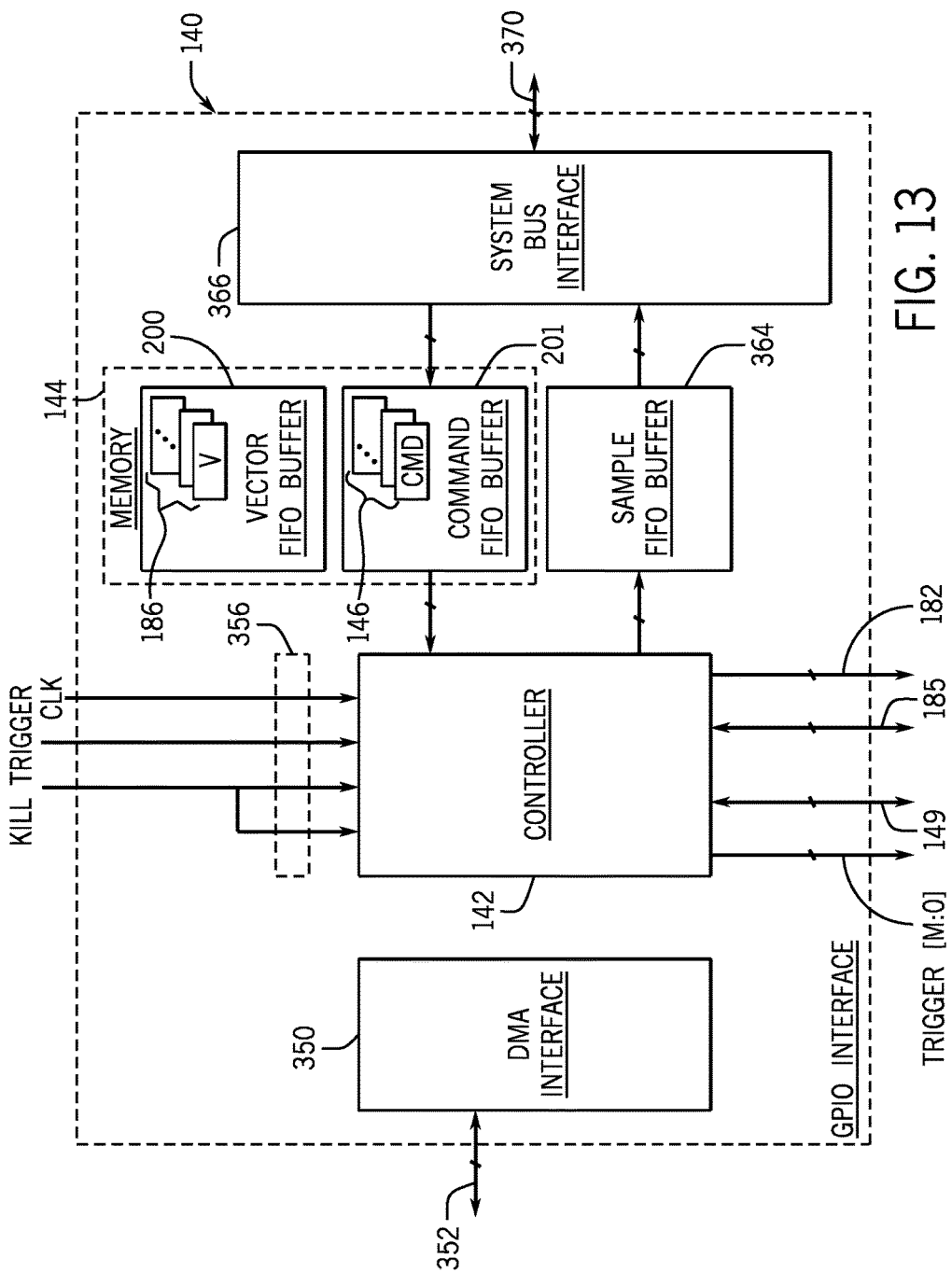
FIG. 13 is a schematic diagram of the I/O interface controller of FIG. 2 according to an example embodiment.

Referring to FIG. 13, in accordance with an example embodiment, the GPIO interface controller 140 includes two first in first out (FIFO) buffers: a command FIFO buffer 201, which forms at least part of the memory 144 and stores the I/O interface commands 146 to be executed by the controller 142; and a sample FIFO buffer 364, which stores data acquired by inputs of the GPIO interface 140. In general, the FIFO buffers 201 and 364 are coupled between a system bus interface 366 and the controller 142, as depicted in FIG. 13, in accordance with example embodiments. Thus, the FIFO buffers 201 and 364 accommodate, for example, different clock rates between the system bus 130 (see FIG. 2) and the controller 142.

In accordance with an example embodiment, the GPIO interface controller 140 further includes a DMA interface 350. In general, the DMA interface 350 is constructed to access the non-volatile memory 164 (see FIG. 2) when the number of commands in the FIFO buffer 201 or the number of vectors 186 stored in the FIFO 200 falls below a predetermined threshold for purposes of retrieving, or fetching, more commands into the FIFO buffers 200 and 201. In this regard, the DMA interface 350 may communicate using various transmit and receive DMA requests and active communication lines 352. The lines 352 may communicate with an arbiter (not shown), in accordance with some embodiments. In further embodiments, the system bus interface 366 may be configured to allow the processor core 150 to access the command FIFO buffers 200 and 201 for purposes of replenishing or storing commands 146 and vectors 186. Depending on the particular embodiment, the DMA interface 350 or the processor core 150 may access the sampled FIFO buffer 364 for purposes of retrieving flash furnishing the sampled data from the GPIO interface. Thus, many variations are contemplated, which are within the scope of the appended claims.

In accordance with example embodiments, the controller 142 is synchronized to a clock signal (called "CLK" in FIG. 13), which, in turn, may be synchronized to the clock of the system bus 130 (at the same frequency or another frequency, as desired). The controller 142 further receives a signal called "KILL," which, when asserted (driven to a logic one level, for example) causes the controller 142 to asynchronously transition the I/O states of the GPIO interface 140 to predetermined "safe" levels. In this regard, in accordance with example embodiments, a register 148 of the GPIO interface controller 140 may be programmed with bits that correspond to predetermined safe levels for corresponding I/Os. In general, a safe level causes no harm in the system in the event of a fault condition. For example, a safe level for a signal that is used to drive a switching transistor may be a logic one level, a level that turns off the switching transistor for this example. For other applications, a safe level for a given I/O may be a logic one level or, alternatively, a tri-state condition.

In some embodiments, the controller 142 is constructed to, in response to detecting the asserted KILL signal, maintain the I/Os in their respective safe levels until the next I/O interface command 146 is executed. Thus, the safe levels remain for the duration of the current time interval for the most recently-executed I/O interface command 146. In further embodiments, the KILL signal may trigger a persistent kill state, a safe state in which the controller 142 maintains the I/Os at their respective safe levels until the processor core 150 resets the GPIO interface 140. Thus, in the persistent safe state, the GPIO interface controller 140 is effectively disabled until further corrective action is taken by the processor core 150.

The safe state may be triggered internally by the controller 142, in accordance with further embodiments. For example, in accordance with some embodiments, upon detecting a logical combination of one or more input states (as sensed at the I/Os of the GPIO interface 140, for example), the controller 142 may initiate the KILL state. Thus, many variations are contemplated, which are within the scope of the appended claims.

In accordance with some embodiments, the controller 142 receives an external signal called "TRIGGER," which, when asserted (driven to a logic one level, for example), causes the controller 142 to begin executing the commands 146 stored in the command FIFO buffer 360. It is noted that in accordance with example embodiments, the controller 142 may begin executing the commands 146 in response to an internal trigger, such as a trigger generated in response to a certain combination of logic levels.

Figure 14:
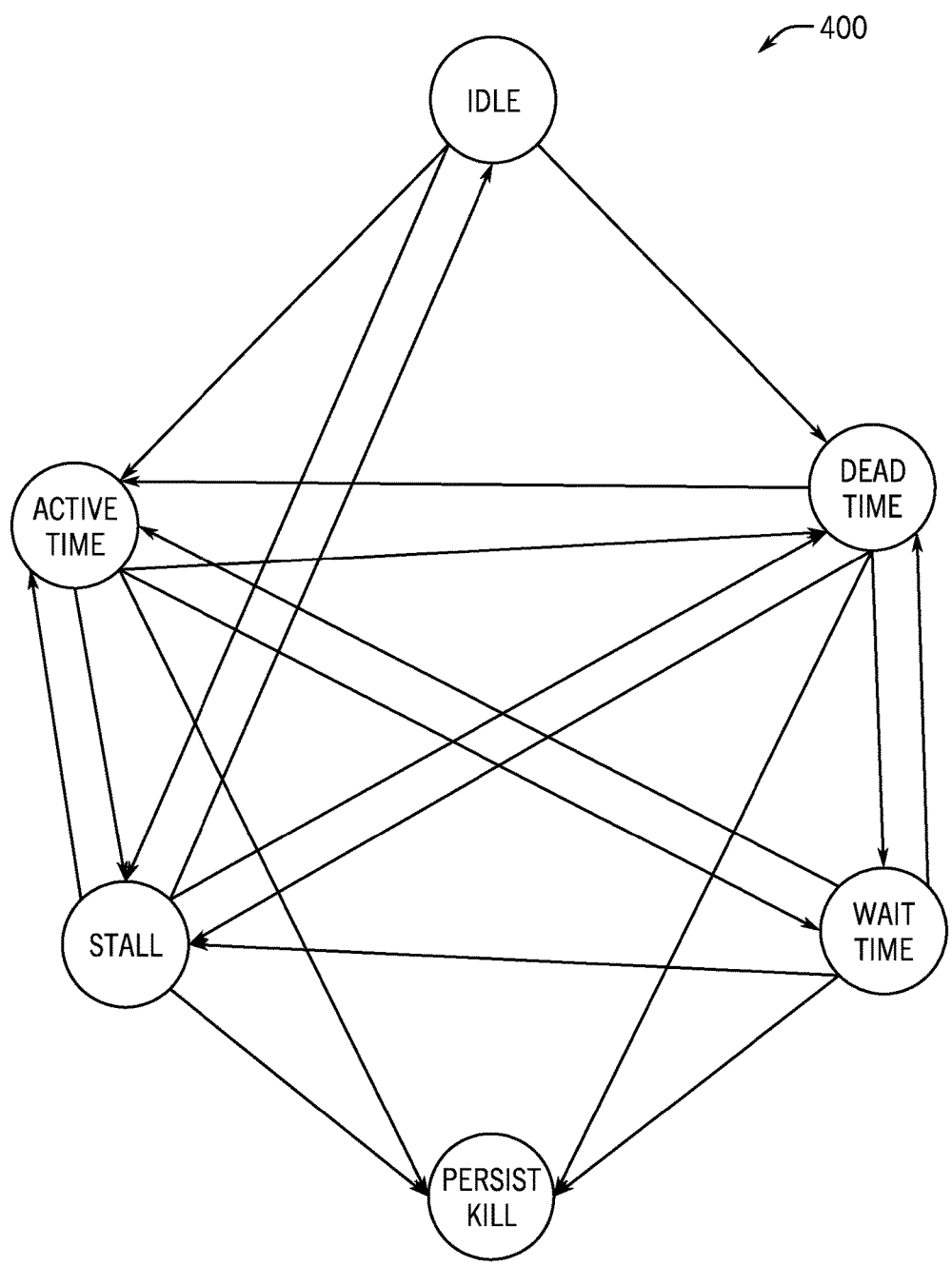
FIG. 14 is a state diagram of the I/O interface controller according to an example embodiment.

Referring to FIG. 14, in accordance with some embodiments, the controller 142 may have an associated state diagram 400 for purposes of executing the I/O commands 146. When powered up, the controller 142 enters an IDLE state where the controller 142 remains until a trigger event occurs, which controls the starting point of the I/O waveform on a cycle by cycle basis. As can be appreciated by the skilled artisan, the cycle by cycle control of the I/O waveform may be performed quite accurately, in accordance with example embodiments. In some embodiments, the controller 142 may (as configured by a particular register bit, for example) be constructed to insert a "dead time" interval at the beginning of certain cycles. This may be used, for example, when switching signals are generated for purposes of ensuring that certain switching signals do not overlap in time. Thus, when executing some commands that satisfy a certain combination of I/O levels, the controller 142 may initially transition to a DEAD TIME state for purposes of incurring the dead time at the beginning of the cycle.

From the DEAD TIME state or from the IDLE state, the controller 142 transitions, upon execution of a I/O interface command 146 to the ACTIVE TIME state, the state in which the controller 142 executes the I/O interface command 146, assuming no problems occur. For example, if a problem does occur, depending on the particular embodiment, the controller 142 may transition from the ACTIVE TIME to a PERSIST KILL state, a state where the controller 142 remains until reset by the processor core 150.

Thus, at the end of the cycle duration, the controller 142 may further transition from the ACTIVE TIME state to a WAIT TIME state for purposes of waiting for a particular logic level (to implement a handshaking protocol, for example). Upon receiving the input, the controller 142 transitions from the WAIT TIME state back to the ACTIVE TIME state. Thus, as depicted in FIG. 8, from the ACTIVE TIME state, the controller 142 may transition to the DEAD TIME state, the STALL state, the WAIT TIME state or the PERSIST KILL state.

The controller 142 enters the STALL state when the FIFO buffer 201 is empty at the end of the state duration. In the STALL state, any valid command continues the operation and thus, control transitions either to the DEAD TIME or to the ACTIVE TIME state. However, the STALL state, the controller 142 may be configured to be disabled, which causes the controller 142 to transition back to the IDLE state. It is noted that the PERSIST KILL state may be reached from any of the ACTIVE TIME, DEAD TIME, WAIT TIME, or STALL states, as depicted in FIG. 14.

Other embodiments are contemplated and are within the scope of the appended claims. For example, referring back to FIG. 4, in accordance with further embodiments, the widths of the duration 202 and distribution 203 fields of the vector 186 may be configurable, or programmable, thereby providing a tradeoff of more/less duration time count versus the number of triggers. In general, the interpretation of the fields of the vector 186 may be set, by, for example, dedicated bits in the vector 186 or by configuration bits in one of the registers 148 (see FIG. 2). Moreover, in accordance with example embodiments, the entire width of the vector 186 may be scaled.

Figure 15:
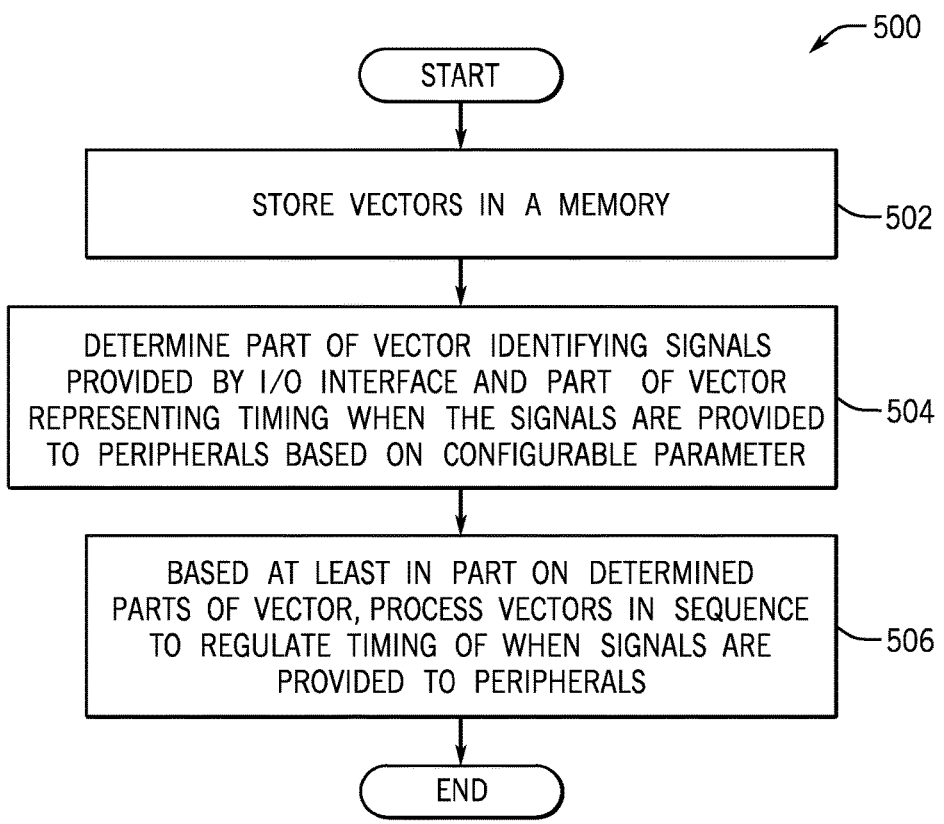
FIG. 15 is a flow diagram depicting a vector-based signal routing technique according to an example embodiment.

Thus, referring to FIG. 15, in accordance with example embodiments, a technique 500 includes storing (block 502) vectors in a memory and determining (block 504) a part of the vector that identifies signals that are provided by an I/O interface and part of the vector that represents a timing of when the signals are provided to the peripherals based on a configurable parameter. Based on this determination, the technique 500 includes processing (block 506) the vectors in a sequence to regulate a timing of when the signals are provided to the peripherals.

Figure 16:
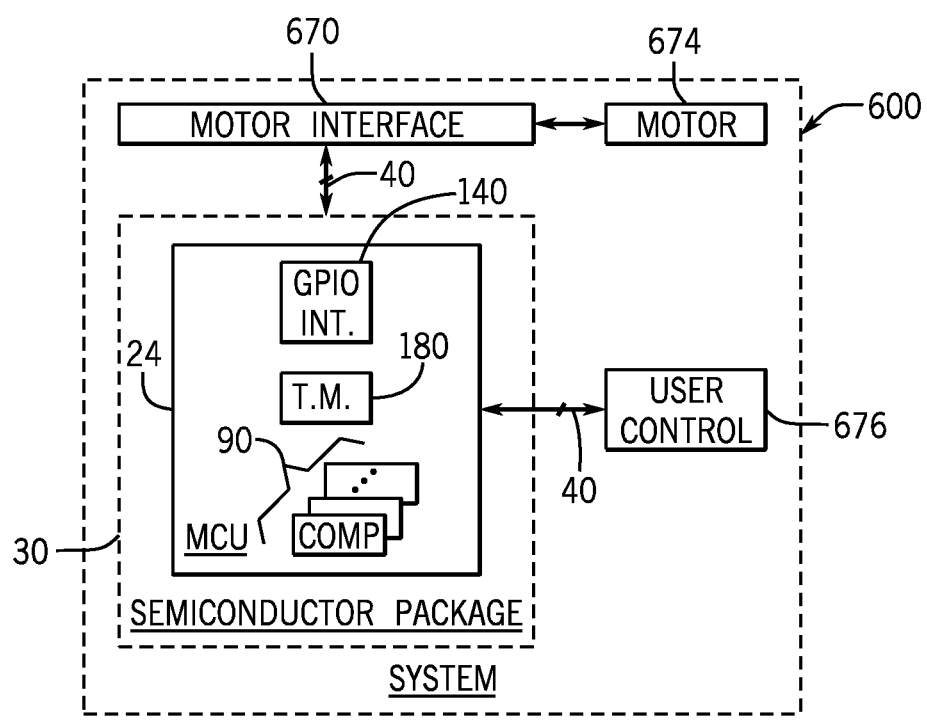
FIG. 16 is a schematic diagram of a motor control system according to an example embodiment.

The MCU 24 may be used in numerous different applications. As an example, FIG. 16 depicts a motor control application for the system 10 of FIG. 1, which is depicted as a motor control system 600 in FIG. 16. Referring to FIG. 16, the motor control system 600 generates/receives input and output signals (I/O signals) for purposes of controlling a motor 674. In this manner, the GPIO interface 140 of the MCU 24 may generate signals at its I/O terminals 40 for purposes of communicating with a motor interface 670 (an interface containing drivers, sensors, and so forth); and in connection with this communication, the I/O terminals 40 may communicate waveforms (PWM signals, for example) with the motor interface, receive sensed currents and voltages, communicate data via one or more serial buses, and so forth. I/O terminals 40 of the GPIO interface 140 may further generate/receive signals to communicate with a user control interface 676 of the system 600 for such purposes as communicating status of the motor 674 or motor interface 670, communicating detected fault conditions, receiving user-directed commands and signals, and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:
1. An apparatus comprising:
   a memory to store data representing a plurality of vectors, wherein each vector of the plurality of vectors comprises a distribution field identifying an associated set of input/outputs (I/Os) of an input/output (I/O) interface for communicating with a plurality of peripherals and a time value field identifying an associated time value; and
   a control circuit adapted to:
      process the plurality of vectors in a sequence; and
      in response to processing each vector of the plurality of vectors, communicate a plurality of signals with a set of peripherals of the plurality of peripherals using the associated set of I/Os identified by the distribution field of the vector being processed and regulate a time that communication of the plurality of signals occurs based on the associated time value identified by the time value field of the vector being processed.

2. The apparatus of claim 1, further comprising a signal conditioning circuit, associated with a first peripheral of the set of peripherals, and adapted to be programmed to condition at least one signal of the plurality of signals to satisfy a specification of the first peripheral.

3. The apparatus of claim 2, wherein the signal conditioning circuit is adapted to be programmed to modify a timing of the at least one signal.

4. The apparatus of claim 2, wherein the signal conditioning circuit is adapted to be programmed to asynchronously communicate the at least one signal with the first peripheral.

5. The apparatus of claim 1, wherein the control circuit is further adapted to be programmed with criteria applied by the control circuit to identify a first part of a given vector of the plurality of vectors associated with the distribution field and a second part of the given vector of the plurality of vectors associated with the time value field.

6. The apparatus of claim 5, wherein the control circuit is further adapted to read data indicative of the criteria from a designated part of the given vector.

7. The apparatus of claim 5, wherein the control circuit is further adapted to read data indicative of the criteria from a register.

8. A method comprising:
storing a plurality of vectors, wherein each vector of the plurality of vectors comprises a distribution field identifying an associated set of input/outputs (I/Os) of an input/output (I/O) interface for communicating with a plurality of peripherals and a time value field identifying an associated time value; and
processing the plurality of vectors in a sequence to, for each vector of the plurality of vectors being processed, communicate a plurality of signals with a set of peripherals of the plurality of peripherals using the associated set of I/Os identified by the distribution field of the vector being processed, and regulate a time that communication of the plurality of signals occurs based on the associated time value identified by the time value field of the vector being processed.

9. The method of claim 8, wherein the storing comprises storing data representing the plurality of vectors in a memory of the I/O interface.

10. The method of claim 8, further comprising: conditioning at least one signal of the plurality of signals based on a specification of a peripheral of the set of peripherals.

11. The method of claim 10, wherein the conditioning comprises modifying a timing of a waveform of the at least one signal.

12. The method of claim 11, wherein modifying the timing comprises modifying a time duration of a pulse of the at least one signal.

13. The method of claim 8, further comprising programming the I/O interface with criteria to apply to identify a first vector field associated with a given signal of the plurality of signals and a second part vector field associated with a time value for the at least one signal.

14. An apparatus comprising:
a plurality of peripherals;
an integrated circuit comprising an input/output (I/O) interface, wherein the I/O interface comprises a plurality of input/outputs (I/Os);
a memory to store data representing a plurality of vectors, wherein each vector of the plurality of vectors comprises a distribution field identifying an associated set of input/outputs (I/Os) of the plurality of I/Os for communicating with the plurality of peripherals and a time value field identifying an associated time value; and
a control circuit to:
process the plurality of vectors in a sequence; and
in response to processing each vector of the plurality of vectors, communicate a plurality of signals with a set of peripherals of the plurality of peripherals using the associated set of I/Os identified by the distribution field of the vector being processed and regulate a time that communication of the plurality of signals occurs based on the associated time value identified by the time value field of the vector being processed.

15. The apparatus of claim 14, wherein at least one of the vectors of the plurality of vectors identifies a time value representing a duration for which an associated first signal of the plurality of signals is to be routed to a of the plurality of peripherals.

16. The apparatus of claim 15, further comprising a signal conditioning circuit associated with a given peripheral of the set of peripherals and adapted to be programmed to condition the first signal to satisfy an associated specification of the given peripheral.

17. The apparatus of claim 16, wherein the signal conditioning circuit is adapted to be programmed to modify a timing of the first signal.

18. The apparatus of claim 16, wherein the signal conditioning circuit is adapted to be programmed with a communication protocol used by the given peripheral.

19. The apparatus of claim 15, wherein the first signal comprises a triggering signal for the given peripheral.

* * * * *